United States Patent
Mader et al.

(10) Patent No.: US 9,202,506 B1
(45) Date of Patent: Dec. 1, 2015

(54) CURRENT BOOST PROFILE APPLIED TO LASER DURING HEAT-ASSISTED MAGNETIC RECORDING

(71) Applicant: Seagate Technology LLC, Cupertino, CA (US)

(72) Inventors: Drew Michael Mader, Bloomington, MN (US); Alfredo Sam Chu, Prior Lake, MN (US); Jason Riddering, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/595,740

(22) Filed: Jan. 13, 2015

(51) Int. Cl.
*G11B 7/1263* (2012.01)
*G11B 5/31* (2006.01)
*G11B 5/48* (2006.01)
*G11B 5/60* (2006.01)
*G11B 5/00* (2006.01)

(52) U.S. Cl.
CPC ............ *G11B 7/1263* (2013.01); *G11B 5/3133* (2013.01); *G11B 5/4866* (2013.01); *G11B 5/6088* (2013.01); *G11B 2005/0021* (2013.01)

(58) Field of Classification Search
CPC ................... G11B 11/10595; G11B 11/10506; G11B 11/1053; G11B 71/126; G11B 5/02; G11B 5/455; G11B 2005/0021; G11B 5/4866; G11B 2005/001; G11B 7/1263; G11B 5/6088; G11B 5/3133
USPC ....................... 369/13.24, 13.26, 13.33, 13.13
See application file for complete search history.

(56) References Cited

U.S. PATENT DOCUMENTS

| | | | |
|---|---|---|---|
| 8,873,350 B2 * | 10/2014 | Rausch et al. ............. | 369/13.33 |
| 8,897,103 B2 * | 11/2014 | Alex .......................... | 369/13.26 |
| 2013/0077453 A1 | 3/2013 | Alex | |
| 2014/0029397 A1 | 1/2014 | Rausch et al. | |

* cited by examiner

*Primary Examiner* — Ali Neyzari
(74) *Attorney, Agent, or Firm* — Hollingsworth Davis, LLC

(57) ABSTRACT

A power level is applied to a laser that heats a heat-assisted recording medium is increased during recording for a plurality of iterations. Each iteration involves writing test data to a plurality of sequential tracks of the recording medium using the power level and determining bit error rates of the test data. Based on the bit error rates of the iterations, a power boost profile is determined. The power boost profile starts at a baseline level at a first track of a plurality of sequentially-written tracks, incrementally increases to a steady-state level over a first portion of the tracks, and remains at the steady-state level over subsequent ones of the tracks. The power boost profile is applied to the laser when recording to the recording medium.

20 Claims, 6 Drawing Sheets

CURRENT BOOST PROFILE APPLIED TO LASER DURING HEAT-ASSISTED MAGNETIC RECORDING

SUMMARY

The present disclosure is directed to a method and apparatus for determining and applying a current boost profile to a laser during a heat-assisted recording medium. In one embodiment, a power level applied to a laser that heats a heat-assisted recording medium is increased during recording for a plurality of iterations. Each iteration involves writing test data to a plurality of sequential tracks of the recording medium using the power level and determining bit error rates of the test data. Based on the bit error rates of the iterations, a power boost profile is determined. The power boost profile starts at a baseline level at a first track of a plurality of sequentially-written tracks, incrementally increases to a steady-state level over a first portion of the tracks, and remains at the steady-state level over subsequent ones of the tracks. The power boost profile is applied to the laser when recording to the recording medium.

Another embodiment involves determining that a write operation will encompass a plurality of sequential tracks of a heat-assisted recording medium. A first track of the tracks is written using a baseline level of power applied to a laser that heats the recording medium during recording. The baseline level is incrementally increased to a steady-state level while writing a first portion of the tracks following the first track, the first portion including more than one track. Subsequent ones of the tracks are written using the steady-state level.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to improving performance in devices that use heat-assisted magnetic recording (HAMR). This technology, also referred to as energy-assisted magnetic recording (EAMR), thermally-assisted magnetic recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

Similar to a conventional (e.g., perpendicular) hard disk drive, a HAMR data storage device writes data on a magnetic disk in the form of tracks and sectors. The tracks are concentric circles each formed of a number of data sectors. Interspersed between the data sectors are servo sectors, which are read-only data fields that enable a read/write head to, among other things, find and stay aligned with the data tracks.

Figure 2:
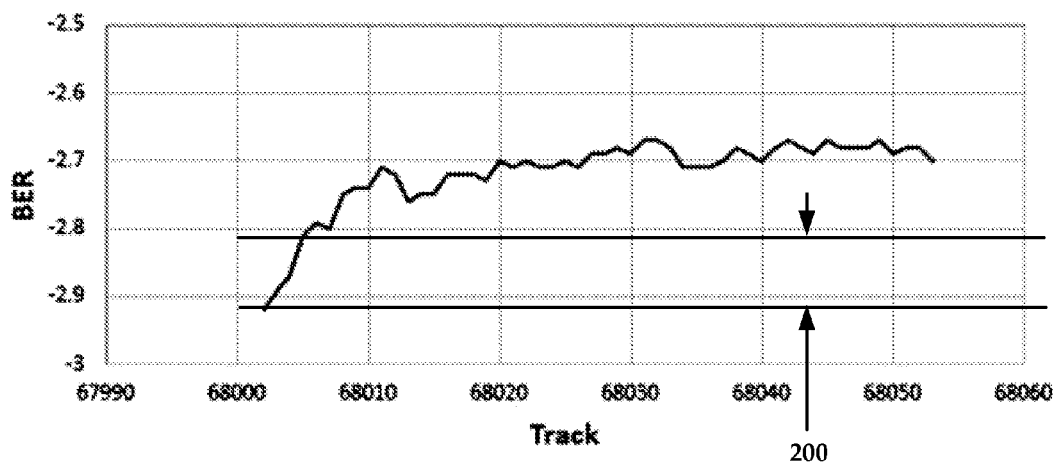
FIG. 2 is a graph showing increased bit error rate of sequentially written data tracks for a hard drive according to an example embodiment.

Data may be written to the tracks in a random or sequential fashion. A sequential write may involve writing to a number of adjacent tracks, whereas a random write may involve longer seeks between non-adjacent tracks. It has been found that during sequential writes for some HAMR drives, bit error rate (BER) increases during the writing of a few tracks (e.g., two to ten) after which the BER stabilizes. An example of this is seen in FIG. 2, which is a graph of BER vs. track number for sequentially written data. This increase in BER can be seen in between tracks 68002 and 68011.

One cause of this increase in BER appears to be heating up of the laser. Generally, as the laser heats up, its efficiency decreases, leading to less heat being applied to the recording medium for a given current level. This can result in reduced recording efficiency and an increase in errors when reading back the data. Accordingly, methods and apparatuses are described below to alleviate these issues and reduce BER over long-term recoding events such as recording sequential data. For example, applying a laser power boost profile during sequential recording can reduce BER, e.g., to within a range of the starting BER, as indicated by BER range 200 in FIG. 2.

The embodiments described below are configured to apply a boost to compensate for a loss of laser efficiency due to thermal effects, e.g., during extended write events. It will be understood to one of ordinary skill in the art that the same techniques can be used to compensate for any effects that thermal energy may have on the laser. For example, if another laser design becomes more efficient as it is heated, then the same embodiments can be configured to apply attenuation to the laser current over a period of time. Generally, any combination of boost and attenuation may be applied to achieve the desired result, e.g., a relatively constant level of BER during sequential recording.

Figure 1:
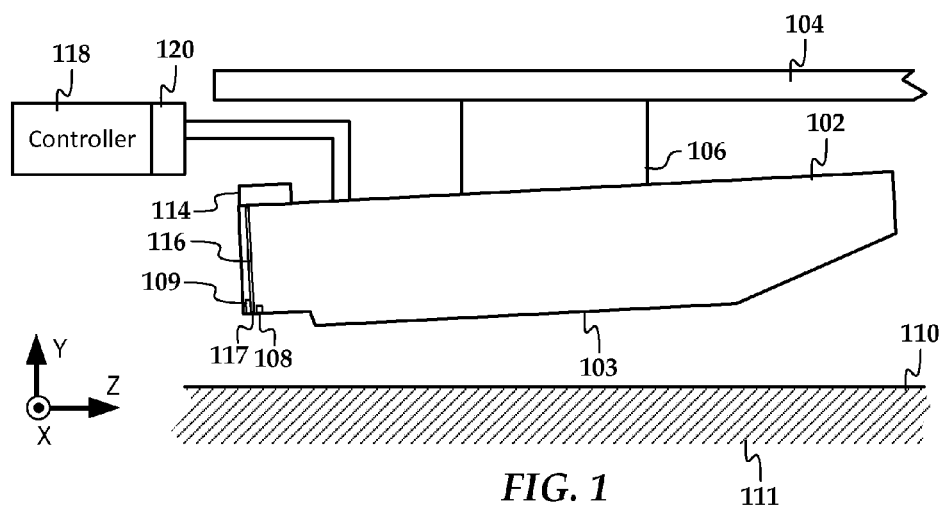
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a HAMR data storage device, e.g., HAMR magnetic hard disk drive (HDD). The read/write head 102 may also be referred to herein as a slider, read head, recording head, etc. The read/write head 102 is coupled to an arm 104 by way of a suspension 106, e.g., a gimbal. The read/write head 102 includes read/write transducers 108, 109 at a trailing edge that are held proximate to a surface 110 of a magnetic recording medium 111, e.g., magnetic disk.

A flying height is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating. To account for both static and dynamic variations that may affect flying height, the read/write head 102 may be configured by one or more heating elements (not shown). These heating elements (e.g., resistance heaters) cause deflection of regions near the read/write transducers (e.g., reader stack, write coil) due to thermal expansion. By providing the heating elements with selectable amounts of current, spacing between the read/write transducers and the surface 110 of the recording medium can be finely controlled.

The read/write head 102 includes a laser 114 coupled to an optical path 116 integrated into the read/write head 102. The optical path 116 includes a near-field transducer 117 near the write transducer 109. The near-field transducer 117 achieves surface plasmon resonance in response to the optical energy, and directs the surface plasmons to heat a surface of the recording medium 111. A controller 118 includes logic circuits that control current supplied to the laser 114, as well as controlling other signals sent to and received from the recording head. Those signals include read and write channel data, adaptive fly height control signals, etc. An interface 120 conditions the signals between the controller 118 and the read/write head, e.g., amplification, filtering, analog-to-digital conversion, digital-to-analog conversion, etc.

In embodiments described below, a controller 118 adaptively modifies electrical power sent to the laser 114, e.g., by changing supplied current. The modified current compensates for reductions in efficiency due to heating of the laser 114 during long write events such as writing sequential tracks. While examples below may describe changing current levels, those of ordinary skill in the art will recognize that voltage may be changed instead of or in addition to current to obtain desired laser power levels.

Figure 3:
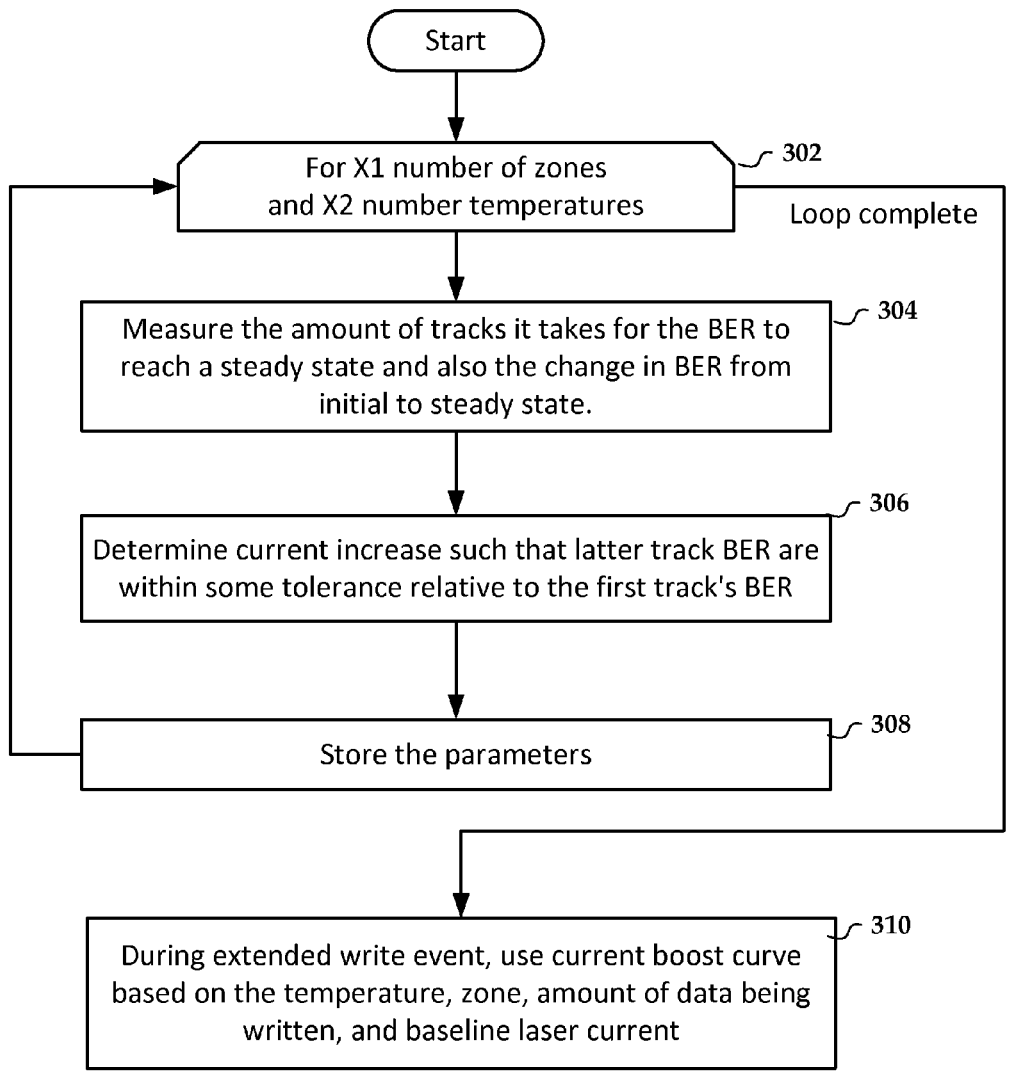
FIG. 3 is a flowchart showing a procedure according to an example embodiment.

A flowchart in FIG. 3 summarizes a procedure for determining a laser current profile according to an example embodiment. The procedure involves iterating through a loop indicated by block 302. Each iteration is performed at different combination of temperature (e.g., ambient temperature) and zone of the disk. Generally, the disk may be divided into different zones at various radii. The zones may have different characteristics, such as the number of data sectors per track in the zone, linear velocity, etc.

For each of the zones and temperatures, a measurement 304 is made of the amount of tracks it takes for the BER to reach a steady-state as well as the amount of change in the BER from initial to steady-state. In the example shown in FIG. 2, this may be estimated as 10 tracks and 0.2 increase in BER (from −2.9 to −2.7). For each measurement 304, a determination 306 is made of a laser current increase needed such that the latter track's BER are within some range relative to the BER of the first track. This results in a current boost profile that can be applied to the laser during operation, and can maintain BER within the range 200 shown in FIG. 2. The determination 306 results in information (e.g., boost parameters) that is stored 308 in a memory, e.g., in a register or other persistent memory accessible during use by a controller. It should be noted that this laser boost profile maintains a desired optical output of the laser to a relatively constant level, and therefore should have minimal effects on thermal expansion at the media-facing surface of recording head. As such, there is no need to adjust inputs to a dynamic fly height heater to compensate for the laser boost.

After the iterations through loop 302 are complete, the parameters that were earlier stored 308 are used during extended write events, such as sequential data writes. The parameters are used to apply 310 a current boost to the laser based on current temperature, zone. The boost may be added to a baseline current value, which can be set to a particular value based on head design, type of media used, track/bit density, etc. Generally, the actions in the loop 302 can be performed once, e.g., during design of a model of storage devices, or during qualification testing of individual storage devices. The current boost is then applied 310 during the operational life of the device.

While the illustrated example shows a plurality of both zones and temperatures being used to determine current boost profiles, just temperature or zone may be used in both the determination and use of the boost levels. In other situations, only one iteration may be involved, e.g., choosing a representative zone and temperature for performing operations 304, 306, and 308. During the extended write event, the same current boost may applied regardless of zone or temperature, or may be adapted to zone and/or temperature based on an algorithm, e.g., scaling based on estimated effects of temperature or zone.

Figures 4, 5:
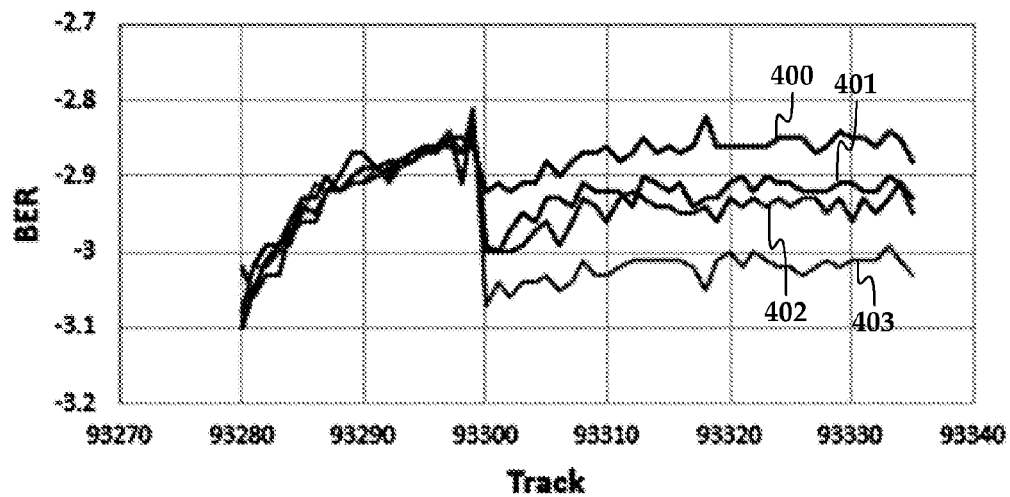
FIG. 4 is a graph showing an example of determining a current increase for a power boost profile according to an example embodiment.
FIG. 5 is a table showing storage of current boost parameters stored in memory according to an example embodiment.

In FIG. 4, a graph shows how an offset current can be determined as described in regards to block 306 in FIG. 3. A baseline current is used to write a number of tracks (about 55 tracks in this example) to a zone, and the data is read back. The bit error rate for the data is shown by curve 400. For each of curves 401-403, the current is incremented starting at track 93300. The current may be incremented, e.g., by increasing the input value to a digital-to-analog converter (DAC) by one, such that curve 400 is DAC+0, curve 401 is DAC+1, curve 402 is DAC+2, and curve 403 is DAC+3. Curve 3 shows a steady-state BER that is closest to the original DAC at the beginning track, 93280. Further, a first portion of the tracks over which the BER reaches steady-state can be determined by inspection/analysis of curve 400, e.g., between track 93280 and 93300.

By utilizing a sequential/continuous write to a set of tracks at different laser power values, a current offset can be defined. This offset may include a steady-state value of current boost and an indicator of how fast the current increases from a baseline level to the steady-state value (e.g., rise time). Generally, this rise time can be expressed as a number of the first portion of tracks that are written after the first track. During writing of the first portion of tracks, the laser current is increased from the baseline level to the steady-state level. The laser current may be incrementally increased over the first portion of tracks, e.g., approximating a smooth curve.

Because the laser current may be specified by a controller using discrete DAC values, the actual current boost profile may appear stepped instead of smooth. Nonetheless, there may be as many incremental steps in the boost profile as there are tracks in the first portion, thereby approximating a smooth curve. For example, assume the first portion includes two tracks following a first track, the first track being set to power-level P1, and the steady-state value being P1+6. The tracks of the first portion may be set to P1+2 and P1+5, and subsequent tracks will use the steady-state P1+6 power level.

The current boost profiles may be stored as a lookup table in one embodiment, as shown in the table 500 of FIG. 5. For purposes of illustration, this assumes the current boost is set for one of four zones and one of four ambient temperature ranges. In practice, a larger (or smaller) number of zones and/or temperature ranges may be used. Each zone is shown in column 502 and a center point of each temperature range is shown in column 504. Column 506 indicates a power boost that is applied to a HAMR laser at the beginning of an extended write event such as sequential writing.

The boost values in column 506 are shown as curves which can indicate a maximum boost amount (e.g., steady-state value), as well as a time-equivalent value indicating when steady-state may be expected. As described previously, this latter value may be expressed as a number of tracks, which may correspond to a roughly equal time for different tracks within a given zone. Other measureable values may be used to define this time-dependent value, including elapsed time, number of sectors, etc. Further, each boost shape may be based on a common pattern, e.g., a logarithmic curve. In such a case, a parameter such as time constant and maximum value may be sufficient to define the curve. The curves may be defined in other ways, e.g., piecewise linear curve, polynomial curve. In practice, the curves will be discretized to facilitate input to a DAC, and the curves may be stored in a discretized form or discrete values may be derived on-the-fly based on curve parameters described above.

While the illustrated table 500 illustrates one way of defining and later determining laser power boost profiles, other ways may be devised. For example, a surface of values may be fit using the data gathered, e.g., using the procedure in FIG. 3. In such a case, the DAC input used to set current for a particular track offset n at a zone z and temperature T may be determined based on a function $DAC=DAC_{baseline}+boost(n, z, T)$. Another optional function may also be defined, e.g., $t\_min(z, T)$, which provides a minimum number of sequential tracks that are to be written, above which boost needs to be applied. If the writer is writing fewer than t_min, there may be no need to calculate and apply boost, e.g., reducing the need for computations for random writes. Such a t_min value may also be added as a column to a table such as shown in FIG. 5

Figure 6:
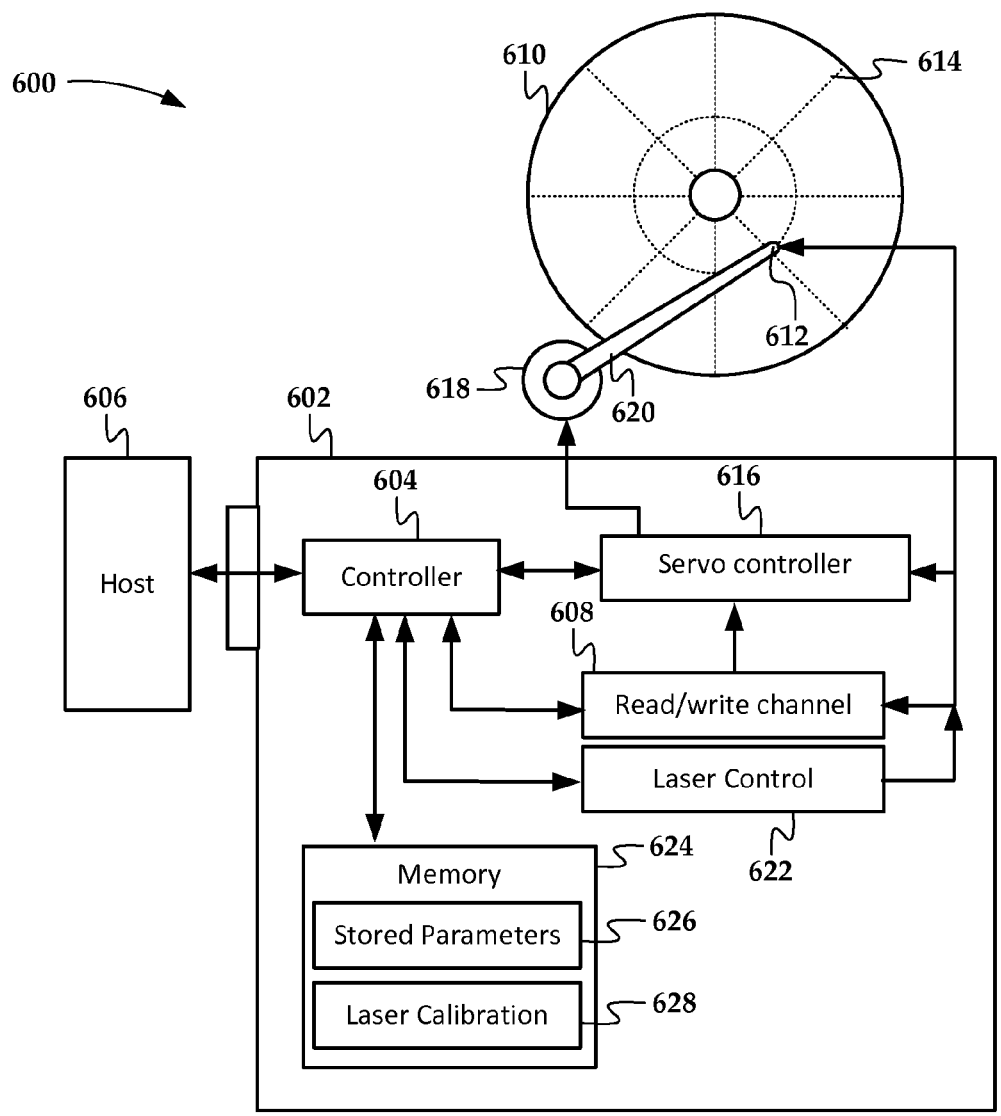
FIG. 6 is a block diagram of an apparatus according to an example embodiment.

In FIG. 6, a simplified block diagram illustrates a data storage apparatus 600. The apparatus 600 includes circuitry 602 such as one or more controllers 604 that control functions of the apparatus 600. These functions include processing read and write commands and associated data from a host device 606. The host device 606 may include any electronic device that can be communicatively coupled to store and retrieve data from a data storage device, e.g., a computer. The data controller 604 is coupled to a read/write channel 608 that reads from and writes to a surface of a magnetic disk 610 that is driven by a spindle motor (not shown). The magnetic disk 610 is configured as a HAMR recording medium.

The read/write channel 608 generally converts data between the digital signals processed by the data controller 604 and the analog signals conducted through one or more read/write heads 612. The read/write channel 608 also provides servo data read from servo wedges 614 on the magnetic disk 610 to a servo controller 616. The servo controller 616 uses these signals to drive an actuator 618 (e.g., voice coil motor, or VCM and/or micro-actuator) that rotates an arm 620 upon which the read/write heads 612 are mounted. Data within the servo wedges 614 can be used to detect and maintain the location of a read/write head 612.

The circuitry 602 further includes laser control modules 622 that may include logic circuits used to select power levels for one or more lasers mounted on the read/write head 612. The laser control modules 622 also include analog circuitry such as a preamplifier for conditioning the signals sent to the laser. The laser control modules 622 provide a baseline laser current during recording to the disk 610, and these are adjusted/boosted for relatively long recording events, e.g., writing of sequential tracks. The determination of the laser boost level may be performed by a laser calibration module 628, which is shown here stored as instruction in persistent memory 624.

The laser calibration module 628 may operate during an initial calibration procedure, e.g., during qualification testing, or in development of the apparatus. The procedure involves increasing a power level applied to the laser for a plurality if iterations. Each iteration involves writing test data to a plurality of sequential tracks of the disk 610 using the power level and determining first bit error rates of the test data. Based on the first bit error rates of the iterations, a current boost profile can be determined. The current boost profile starts at a baseline level at a first track of the tracks and incrementally increases to a steady-state level over a first portion of the tracks. The current boost profile remains at the steady-state level when writing subsequent ones of the tracks.

The iterations may be performed over a plurality of ambient temperatures and/or zones, and the current boost profile may be specific to an ambient temperature, zone, or combination thereof. This procedure may also be performed by a unit separate from the apparatus 600, e.g., under instructions from the host 606, which may be part of a testing system. Thereafter, information (e.g., parameters 626) describing the boost levels may be stored in memory 624. The controller 604 reads these parameters 626 when recording sequential data to the disk 610, and uses the parameters 626 to apply the current boost profile to the laser when recording.

For example, the controller 604 may determine that a write operation (e.g., requested by host 606) will encompass a plurality of sequential tracks of the recording medium (e.g., disk 610). The controller 604 (e.g., via read/write channel 608 and servo controller 616) writes a first track of the plurality of sequential tracks using a baseline level of power applied to the laser. The baseline level is incrementally increased to a steady-state level while writing a first portion of the plurality of sequential tracks following the first track. The first portion generally includes more than one track, e.g., two to N tracks, where N>2, and may be up to 8, 10, 15, or more tracks. Subsequent ones of the plurality of sequential tracks are written using the steady-state level of current.

Figure 7:
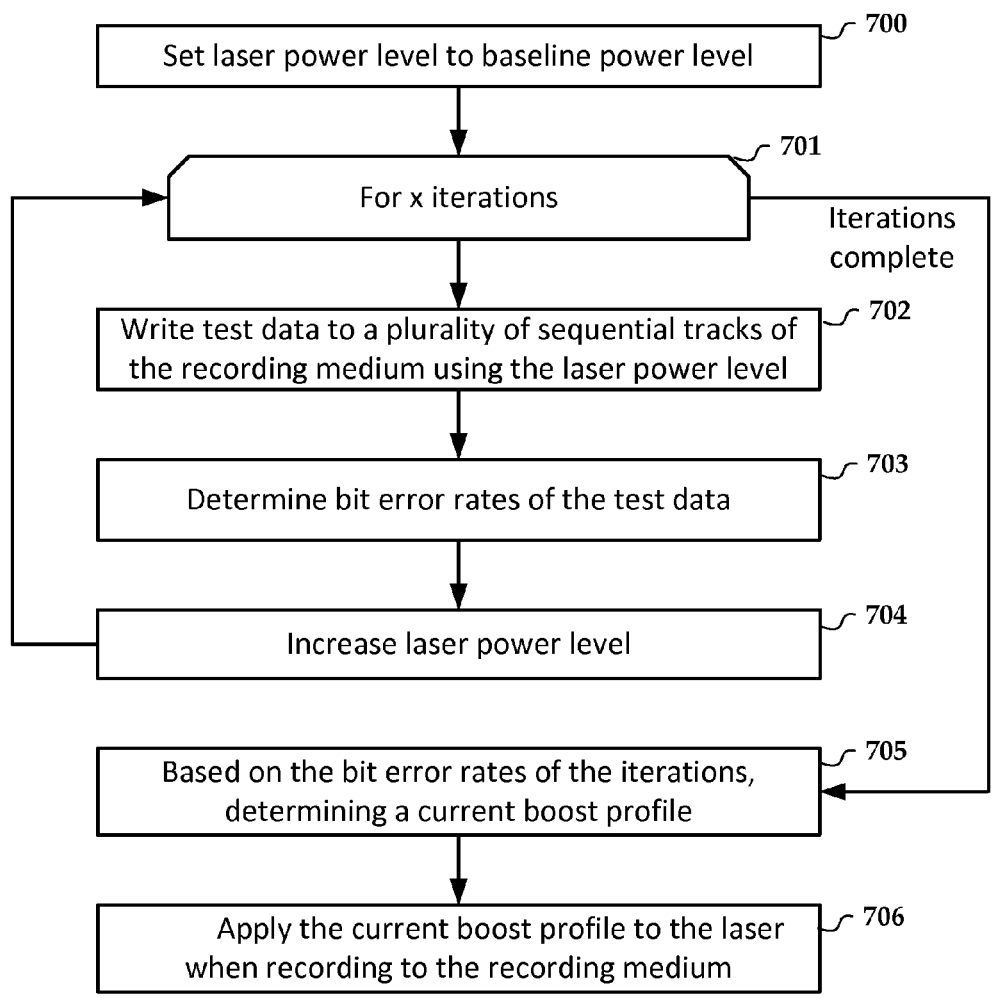
FIGS. 7 and 8 are flowcharts of methods according to example embodiments.

In FIG. 7, a flowchart illustrates a method according to an example embodiment. The method involves setting 700 a laser power to a baseline level. The laser heats a heat-assisted recording medium during recording. A number of iterations are performed as indicated by block 701. For each iteration, test data is written to a plurality of sequential tracks of the recording medium using the power level, and bit error rates of the test data are determined. The power level is then increased 704 and the next iteration is performed. When the iterations are complete (e.g., based on a count, maximum laser current, steady-state current that minimizes BER is found, etc.). control passes to block 705.

Based on the bit error rates of the iterations, a power boost profile is determined 705. The power boost profile starts at a baseline level at a first track of a plurality of sequentially-written tracks and incrementally increases to a steady-state level over a first portion of the tracks. The power boost level remains at the steady-state level over subsequent ones of the tracks. The boost profile may be defined at least by the steady-state level and a number of the first portion of the tracks. The steady-state level may be found, e.g., by a steady-state BER determined at 704 that is close the BER of the first track. The number of the first portion of the tracks may be determined by examining BER curves found at 704, e.g., where slope of smoothed BER curve approaches some value, where local average BER remains within some threshold, etc.

Information describing the boost profiles may be stored in a memory. The current boost profile can then be applied 706 to the laser when recording to the recording medium. The iterations indicated by block 701 may be repeated over a plurality of zones of the recording medium and/or a plurality of ambient temperatures. In such a case, the current boost profile determined at 705 may include a plurality of current boost profiles each respectively associated with one of the plurality of zones, one of the plurality of ambient temperatures, or a combination of zone and ambient temperature.

Figure 8:
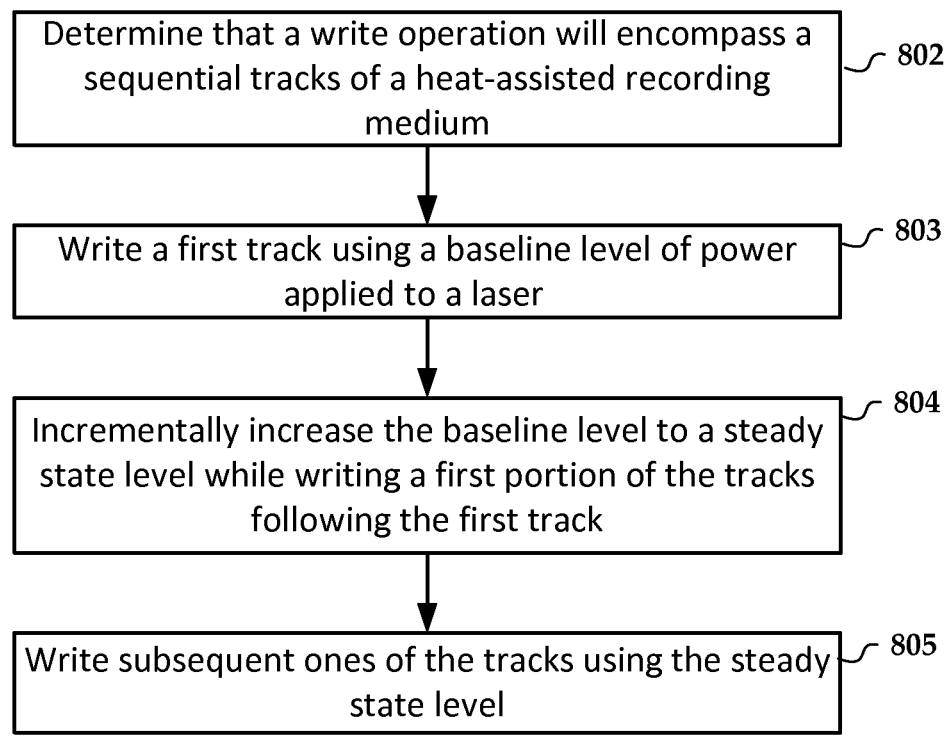

In FIG. 8, a flowchart illustrates a method according to another example embodiment. The method involves determining 802 that a write operation will encompass a plurality of sequential tracks of a heat-assisted recording medium. A first track of the tracks is written 803 using a baseline level of power applied to a laser that heats the recording medium during recording. The baseline level is incrementally increased 804 to a steady-state level while writing a first portion of the tracks following the first track. The first portion includes more than one track, e.g., two to ten. Subsequent ones of the tracks are then written 805 using the steady-state level. The steady-state level and a number of the first portion of the tracks may be defined as a boost profile and read from a memory. The current boost profile may include a plurality of current boost profiles each respectively associated with one of a plurality of zones, one of a plurality of ambient temperatures, or a combination of zone and ambient temperature.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor, controller, or similar computing hardware. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   increasing a power level applied to a laser that heats a heat-assisted recording medium during recording for a plurality of iterations, each iteration involving:
      writing test data to a plurality of sequential tracks of the recording medium using the power level; and
      determining bit error rates of the test data;
   based on the bit error rates of the iterations, determining a power boost profile that starts at a baseline level at a first track of a plurality of sequentially-written tracks, incrementally increases to a steady-state level over a first portion of the tracks, and remains at the steady-state level over subsequent ones of the tracks; and
   applying the power boost profile to the laser when recording to the recording medium.

2. The method of claim 1, wherein the power boost profile compensates for a thermally-induced loss of efficiency of the laser, and reduces the bit error rate of the first portion of the tracks and the subsequent ones of the tracks.

3. The method of claim 1, wherein the iterations are repeated over a plurality of zones of the recording medium, and wherein the power boost profile comprises a plurality of power boost profiles each respectively associated with one of the plurality of zones.

4. The method of claim 3, wherein the iterations are repeated over a plurality of ambient temperatures, and wherein the plurality of power boost profiles are each respectively associated with one of the plurality of zones and one of the plurality of ambient temperatures.

5. The method of claim 1, wherein the iterations are repeated over a plurality of ambient temperatures, and wherein the power boost profile comprises a plurality of power boost profiles each respectively associated with one of the ambient temperatures.

6. The method of claim 1, wherein the first portion of the tracks comprises between two and N tracks, where N>2.

7. The method of claim 1, further comprising storing parameters describing the power boost profile in a memory of an apparatus that comprises the heat-assisted recording medium and the laser, the parameters read from the memory when recording to the recording medium.

8. A method comprising:
   determining that a write operation will encompass a plurality of sequential tracks of a heat-assisted recording medium;
   writing a first track of the sequential tracks using a baseline level of power applied to a laser that heats the recording medium during recording;
   incrementally increasing the baseline level to a steady-state level while writing a first portion of the sequential tracks following the first track, the first portion comprising more than one track; and
   writing subsequent ones of the sequential tracks using the steady-state level.

9. The method of claim 8, wherein incrementally increasing the baseline level of power compensates for a thermally-induced loss of efficiency of the laser, and reduces a bit error rate of the first portion of the tracks and the subsequent ones of the sequential tracks.

10. The method of claim 8, further comprising determining a zone that encompasses the plurality of sequential tracks, and wherein at least one of the steady-state level and a number of the first portion of the tracks are selected based on the zone.

11. The method of claim 10, further comprising determining an ambient temperature during the write operation, and wherein at least one of the steady-state level and the number of the first portion of the tracks are selected based on the zone and the ambient temperature.

12. The method of claim 8, further comprising determining an ambient temperature during the write operation, and wherein at least one of the steady-state level and a number of the first portion of the tracks are selected based on the ambient temperature.

13. The method of claim 8, wherein the first portion of the track comprises between two and N tracks, where N>2.

14. The method of claim 8, wherein the steady-state level and a number of the first portion of the tracks are defined as a power boost profile, the method further comprising reading parameters describing the power boost profile from a memory of an apparatus that comprises the heat-assisted recording medium and the laser.

15. An apparatus comprising:
   a controller coupled to circuitry that provides power to a laser that heats a heat-assisted recording medium during recording, the controller configured to:
      determine that a write operation will encompass a plurality of sequential tracks of the recording medium;
      write a first track of the plurality of sequential tracks using a baseline level of power applied to the laser;
      incrementally increase the baseline level to a steady-state level while writing a first portion of the plurality of sequential tracks following the first track, the first portion comprising more than one track; and
      write subsequent ones of the plurality of sequential tracks using the steady-state level.

16. The apparatus of claim 15, wherein the incremental increase of the baseline level compensates for a thermally-induced loss of efficiency of the laser, and reduces a bit error rate of the first portion of the tracks and the subsequent ones of the tracks.

17. The apparatus of claim 15, wherein the controller is further configured to determine a zone that encompasses the plurality of sequential tracks, and wherein at least one of the steady-state level and the first portion of the tracks are selected based on the zone.

18. The apparatus of claim 17, wherein the controller is further configured to determine an ambient temperature during the write operation, and wherein at least one of the steady-state level and the first portion of the tracks are selected based on the zone and the ambient temperature.

19. The apparatus of claim 15, wherein the controller is further configured to determine an ambient temperature during the write operation, and wherein at least one of the steady-state level and the first portion of the tracks are selected based on the ambient temperature.

20. The apparatus of claim 15, wherein the first portion of the track comprises between two and N tracks, where N>2.

* * * * *